United States Patent
Carls et al.

(10) Patent No.: US 9,594,472 B2
(45) Date of Patent: Mar. 14, 2017

(54) METHOD AND ARRAY FOR PROVIDING A GRAPHICAL USER INTERFACE, IN PARTICULAR IN A VEHICLE

(75) Inventors: Carl Aron Carls, Haßmmoor (DE); Michael Wittkämper, Braunschweig (DE); Michael Mischke, Hannover (DE); Manuel Joachim, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 236 days.

(21) Appl. No.: 14/342,488

(22) PCT Filed: Aug. 28, 2012

(86) PCT No.: PCT/EP2012/003601
§ 371 (c)(1),
(2), (4) Date: Apr. 9, 2014

(87) PCT Pub. No.: WO2013/029772
PCT Pub. Date: Mar. 7, 2013

(65) Prior Publication Data
US 2014/0331185 A1 Nov. 6, 2014

(30) Foreign Application Priority Data
Sep. 3, 2011 (DE) .................. 10 2011 112 447

(51) Int. Cl.
*G06F 3/0484* (2013.01)
*G06F 3/0482* (2013.01)
(Continued)

(52) U.S. Cl.
CPC ............ *G06F 3/0482* (2013.01); *B60K 37/06* (2013.01); *G01C 21/3664* (2013.01);
(Continued)

(58) Field of Classification Search
CPC .............................. G06F 3/017; G06F 3/04842
(Continued)

(56) References Cited

U.S. PATENT DOCUMENTS 7,062,365 B1 * 6/2006 Fei ....................... B60K 37/02
701/36
8,022,933 B2 * 9/2011 Hardacker .............. G06F 3/016
345/169

(Continued)

FOREIGN PATENT DOCUMENTS

DE  102009032069 A1  1/2011
DE  102009048834 A1  4/2011
(Continued)

OTHER PUBLICATIONS

Search Report for International Patent Application No. PCT/EP2012/003601; Mar. 4, 2013.

*Primary Examiner* — William Bashore
*Assistant Examiner* — Daniel Rodriguez
(74) *Attorney, Agent, or Firm* — Barnes & Thornburg LLP

(57) ABSTRACT

A method and an array for providing a user interface, in particular in a vehicle. In the method, at least one graphical object designated for interaction is depicted in a display area out of reach for the user. In a detection area that is spatially separated from the display area, a gesture of a user is captured and the graphical object interaction is selected. An interaction assigned to the gesture is carried out by the selected graphical object, wherein the position(s) of the selected graphical object during the interaction is/are out of reach for the user.

14 Claims, 4 Drawing Sheets

US 9,594,472 B2
Page 2

(51) Int. Cl.
*B60K 37/06* (2006.01)
*G01C 21/36* (2006.01)
*G06F 3/0488* (2013.01)
*G06F 3/01* (2006.01)
*G06F 3/0481* (2013.01)

(52) U.S. Cl.
CPC .......... *G06F 3/017* (2013.01); *G06F 3/04812* (2013.01); *G06F 3/04842* (2013.01); *G06F 3/04883* (2013.01); *B60K 2350/1052* (2013.01); *B60K 2350/1068* (2013.01)

(58) Field of Classification Search
USPC ........................................................ 715/835
See application file for complete search history.

(56) References Cited

U.S. PATENT DOCUMENTS

| | | | | |
|---|---|---|---|---|
| 8,718,797 | B1* | 5/2014 | Addepalli | H04W 4/046 700/17 |
| 9,345,973 | B1* | 5/2016 | Antkowiak | G07F 17/3209 |
| 2004/0195031 | A1* | 10/2004 | Nagasaka | B60K 35/00 180/271 |
| 2006/0284839 | A1* | 12/2006 | Breed | B62D 1/046 345/156 |
| 2007/0057781 | A1* | 3/2007 | Breed | B60K 35/00 340/457.1 |
| 2007/0075919 | A1* | 4/2007 | Breed | B60R 21/013 345/8 |
| 2008/0122805 | A1* | 5/2008 | Smith | A63F 13/06 345/175 |
| 2009/0027332 | A1* | 1/2009 | Cieler | B60K 35/00 345/156 |
| 2009/0079705 | A1* | 3/2009 | Sizelove | B64D 11/0015 345/173 |
| 2009/0278915 | A1* | 11/2009 | Kramer | G06F 3/017 348/48 |
| 2010/0079413 | A1* | 4/2010 | Kawashima | B60K 35/00 345/175 |
| 2010/0226539 | A1* | 9/2010 | Ishii | G06F 3/0425 382/104 |
| 2011/0022307 | A1 | 1/2011 | Lee | |
| 2011/0050589 | A1 | 3/2011 | Yan et al. | |
| 2011/0164029 | A1* | 7/2011 | King | G06F 3/04883 345/419 |
| 2012/0052264 | A1* | 3/2012 | Cha | G02B 27/0101 428/203 |
| 2012/0069168 | A1* | 3/2012 | Huang | G06F 3/017 348/77 |
| 2012/0095643 | A1* | 4/2012 | Bose | B60K 37/00 701/32.8 |
| 2012/0174004 | A1* | 7/2012 | Seder | G02B 27/01 715/764 |
| 2012/0179328 | A1* | 7/2012 | Goldman-Shenhar | B62D 1/046 701/36 |
| 2014/0090505 | A1* | 4/2014 | Okuyama | G06F 3/0219 74/485 |
| 2015/0029111 | A1* | 1/2015 | Trachte | G06F 3/0418 345/173 |

FOREIGN PATENT DOCUMENTS

| | | |
|---|---|---|
| DE | 102009046376 A1 | 5/2011 |
| DE | 102009059867 A1 | 6/2011 |
| EP | 2018992 A1 | 1/2009 |

* cited by examiner

METHOD AND ARRAY FOR PROVIDING A GRAPHICAL USER INTERFACE, IN PARTICULAR IN A VEHICLE

PRIORITY CLAIM

This patent application is a U.S. National Phase of International Patent Application No. PCT/EP2012/003601, filed 28 Aug. 2012, which claims priority to German Patent Application No. 10 2011 112 447.4, filed 3 Sep. 2011, the disclosures of which are incorporated herein by reference in their entirety.

SUMMARY

The present disclosure relates to a method and an operating system for providing a user interface, in particular in a vehicle. In the method, at least one graphical object provided for interaction is displayed in a display area, and a user's gesture is detected. Furthermore, the graphical object is selected for interaction and an interaction associated with the gesture is carried out using the selected graphical object.

BRIEF DESCRIPTION OF THE DRAWINGS

Illustrative embodiments are described in more detail using disclosed embodiments with reference to the figures.

DETAILED DESCRIPTION OF THE DISCLOSED EMBODIMENTS

Figure 1:
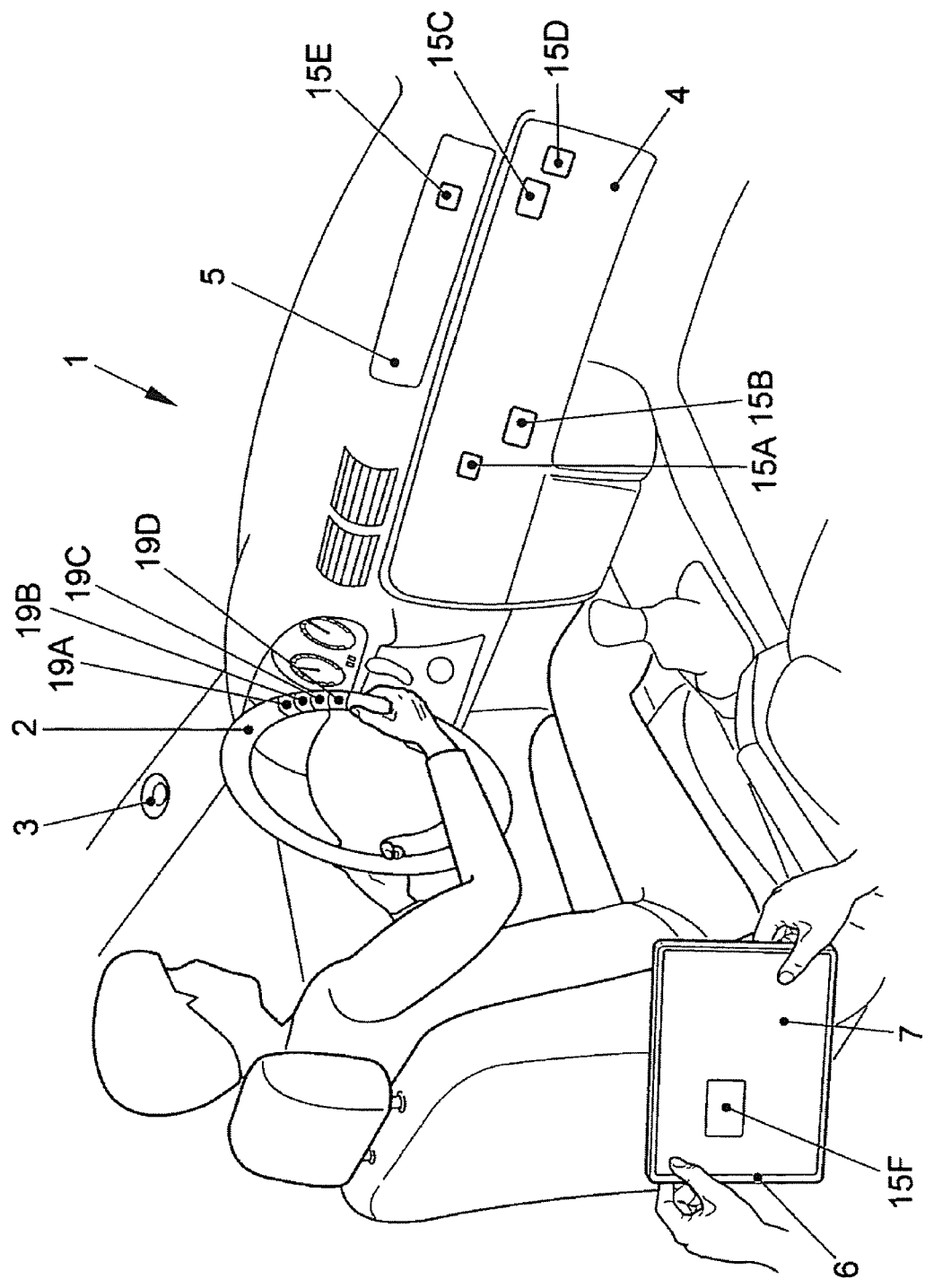
FIG. 1 shows the passenger compartment of a vehicle in which a vehicle operating system for providing a user interface according to at least one disclosed embodiment is arranged.

Illustrative embodiments provide a method and a vehicle operating system for providing a graphical user interface of the type mentioned at the outset which enables simple and intuitive operation and are suitable, in particular, for use in a vehicle.

In the method for providing a user interface, the at least one graphical object provided for interaction is displayed in a display area outside the user's reach and the user's gesture is detected in a detection space which is spatially separate from the display area. In this case, the position(s) adopted by the selected graphical object during interaction is/are outside the user's reach. This also makes it possible to operate remote objects on the display area in a simple manner without the objects having to be moved into the vicinity of the user. In this case, the position of the object provided for interaction is, in particular, independent of the area in which the gesture was detected. The detection space therefore need no longer be formed immediately in front of the display area. It is at a distance from the display area, in particular.

For purposes of the present disclosure, a "gesture" means a particular position of a user's hand or a particular movement carried out with the user's hand. The gestures may be configured in a manner known per se. They comprise, in particular, pointing gestures, swiping gestures and those gestures which are used every day, for example hand rotations, grasping gestures and combinations of a plurality of such gestures which are possibly carried out in immediate short succession. The gestures are carried out in the detection space without the user having to establish a spatial relationship with respect to the display area. In particular, it is not necessary to approach a particular graphical object in the display area. Controlling the user interface using gestures provides the user with a particularly simple and intuitive input possibility for controlling the display contents in the display area or the associated devices.

For purposes of the present disclosure, the term "user's reach" means the user's grasping range without the user having to stretch or strain in the process. For use in the vehicle, the user need not leave his sitting position, in particular. As the driver, he need not change the position of his torso, for example, for this purpose and can carry out the gesture solely from his forearm with his upper arm held in position, for example. The "user's reach" can be changed, if necessary, in a situation-specific manner. The reach can thus be reduced in particular situations, for example when the vehicle is cornering at a relatively high speed, because the user is restricted further in his freedom of movement by the pre-tensioned seat belt.

The graphical object can be selected in any desired manner. It can also be selected, in particular, independently of the detected gesture. It is selected, for example, by the system by means of the respective display context. Alternatively, however, the object can also be selected by means of the gesture. In at least one disclosed embodiment of the method, a selection pointer is displayed in the display area and a relative movement is extracted from the gesture. The position of the selection pointer in the display area is changed on the basis of the extracted relative movement of the gesture, and the graphical object is selected on the basis of the position of the selection pointer. This makes it possible to intuitively remotely control a cursor or a mouse pointer, for example, this control depending only on the relative movement of the gesture in space.

According to at least one disclosed embodiment, a direction in space is determined from the detected gesture, a point in the display area is calculated on the basis of the determined direction, and the selection of the graphical object is visualized if the graphical object is in a predetermined area surrounding the calculated point. This makes it possible to select the graphical object by pointing. The visualization of the targeted graphical object has the advantage that the user immediately receives feedback on his operating action. In this case, the point in the display area can also be visualized when an object has not yet been identified in the area surrounding the point. This avoids the user having to look in the empty space between the objects until he has come across the desired graphical object. This can further speed up the selection method.

The detected gesture can be subdivided into a plurality of phases. In this case, the direction or movement in space can be derived from one phase of the gesture. For example, the first phase of the gesture is used to select the graphical object and the second phase is used to stipulate an interaction category. This is advantageous for graphical objects for which different interactions are defined.

Another disclosed embodiment provides for the possible interaction categories to be visualized on the selected object before the interaction is carried out. As a result, the user can adapt his gestures during the operating process.

In particular, the gestures are contactlessly detected in space. If the gesture is subdivided into a plurality of phases, at least one phase is contactlessly detected in space. Contactless gestures have the advantage, in particular, that the user does not have to pick up any operating means for his operating inputs. This is particularly advantageous when the method is used in a vehicle.

Yet another disclosed embodiment provides for a first phase of the gesture to be detected on a touch-sensitive surface in the user's reach, and for a second phase of the gesture to be contactlessly detected in space, the trajectories of the first and second phases of the gesture being associated with one another. The user can therefore carry out a free-hand gesture in space in an operating move, in which case orientation is facilitated for the user as a result of the gesture starting on a surface in his reach and the gesture can possibly be better associated with an interaction. In this case, in one refinement of the method, in the first phase of the gesture, a contact zone is determined on the basis of the gesture on the touch-sensitive surface, and the object is selected on the basis of the determined contact zone on the touch-sensitive surface. This makes it possible for the user to use a gesture to select a graphical object in a first phase on the touch-sensitive surface and to stipulate the type of interaction with the graphical object in a second phase as a free-hand gesture.

The touch-sensitive surface comprises, in particular, any desired surface at a distance from the display area in the user's reach. When the method is used in a vehicle, the touch-sensitive surface comprises, in particular, a surface in reach of the driver of the vehicle. It may be formed on the steering wheel. This provides the driver of the vehicle with support for particularly purposeful operation without having to remove a hand from the steering wheel in the process.

In still another disclosed embodiment, the position of the selected graphical object in the display area is now changed on the basis of the relative movement of the gesture. In this manner, the user can move a remote graphical object which is selected in any desired manner.

The display area may be designed in any desired manner. It may be a large cohesive display area, one part of which is outside the user's reach. However, at least one disclosed embodiment provides for the display area to comprise at least one first display surface and one second display surface which are spatially separate from one another, and, as a result of the gesture, for the selected graphical object to be moved from the first display surface to the second display surface. This makes it possible to distribute objects to display surfaces which are associated with particular users or user groups or function blocks. This makes it possible, for example, to easily and intuitively link two graphical objects.

In at least one disclosed embodiment of the method, the first and/or second display surface is/are arranged on a device which is releasably connected to the vehicle, in particular on a portable device which is brought along by a vehicle occupant. This makes it possible to intuitively move graphical objects to any desired display surfaces in the vehicle. In this case, the vehicle serves the purpose of providing a defined detection space in which the gestures are detected and are possibly associated with the individual graphical objects. The data associated with the graphical objects can then be transmitted in a manner known per se. The data are transmitted between the devices, for example, using a near-field radio interface, for example Bluetooth.

The array for providing a user interface, in particular in a vehicle, comprises an interface for receiving graphical objects which are stored using data technology and are provided for interaction, a display surface for displaying graphical objects provided for interaction in a display area, and a gesture detection device for detecting a user's gestures in a detection space. In this case, the detection space is determined by the reach of the user restricted within a firmly predefined user area. The apparatus also comprises a control unit which is connected to the interface, to the display surface and to the gesture detection device and can be used to receive signals for selecting graphical objects and can be used to control interactions with the selected graphical object which are associated with the gestures. The apparatus is designed so that, by means of the control unit, the graphical object provided for interaction can be displayed in a display area outside the user's reach, the detection space is spatially separate from the display area, and the interaction can be carried out in such a manner that the position(s) adopted by the selected graphical object during interaction is/are outside the user's reach. The array for providing a user interface is suitable, in particular, for carrying out the method. It, therefore, also has the advantages of the method.

The gestures may be contactlessly detected by a camera system which records temporally resolved video data from the detection space and associates the detected user movements with particular gestures using a connected analysis unit. Alternatively or else additionally, the gesture detection device comprises resistive and/or capacitive surfaces which can be used to detect a first phase of a gesture.

According to illustrative embodiments, a vehicle is also equipped with such an apparatus for providing a user interface.

The array and the method are explained below using disclosed embodiment for a user interface in a vehicle. However, it is pointed out that the user interface can also be used in the same manner for other devices for operating graphical objects and associated functions. The method according to the invention is particularly suitable for large-format display surfaces, in the case of which displayed graphical objects are partially outside the reach of a user placed in front of it owing to the design and/or owing to the prevailing operating situation. The invention can also be used, in particular, in large interactive control panels, for example on information booths or in conference rooms.

FIG. 1 illustrates the passenger compartment of a vehicle 1 in which a vehicle operating system for providing a user interface according to at least one disclosed embodiment is arranged. In the cockpit, the steering wheel 2 is arranged on the driver's side and a large multifunction display 4 is arranged from the center console to the passenger side. Furthermore, further display surfaces are permanently installed in the passenger compartment in the vehicle and can be incorporated for the display and operating concept, for example the additional display 5 arranged in front of the passenger seat and the display 7 of a portable infotainment device 6 brought along by a passenger. The infotainment device 6 is, for example, a portable media playback device or a laptop computer, in particular a computer having a fully touch-sensitive user interface, which are also known as so-called "tablet PCs".

The multifunction display 4, the additional display 5 and the display 7 of the portable infotainment device 6 have a freely programmable display surface on which display contents produced by programs can be displayed at any desired position on the display. For the display and operating concept of the user interface according to the invention, this sum of display surfaces forms a common display area. In this manner, graphical objects 15A-15F can be displayed, selected, moved and operated there, as is explained in yet more detail in connection with the method according to the invention with reference to FIGS. 3A-4D.

For this purpose, one or more cameras 3 which are known per se and can be used to detect gestures for operating the graphical objects 15A-15F are installed in the vehicle 1. The cameras 3 are positioned, for example, at an elevated position beside the windshield or in the roof liner, with the result that the respective spaces which are in the grasping range of the vehicle occupants sitting in the vehicle 1 with their seat belts fastened can be monitored well at any time.

A touch-sensitive surface which is divided into different zones 19A-19D is provided on the steering wheel 2. These zones are advantageously formed on the steering wheel rim or on the impact absorber of the steering wheel 2. Alternatively or else additionally, further touch-sensitive surfaces may be formed in the grasping range of at least one of the vehicle occupants (not illustrated). These touch-sensitive surfaces form, together with the space detected by the camera(s) 3, a detection space 13, the use of which is described in yet more detail further below.

Figure 2:
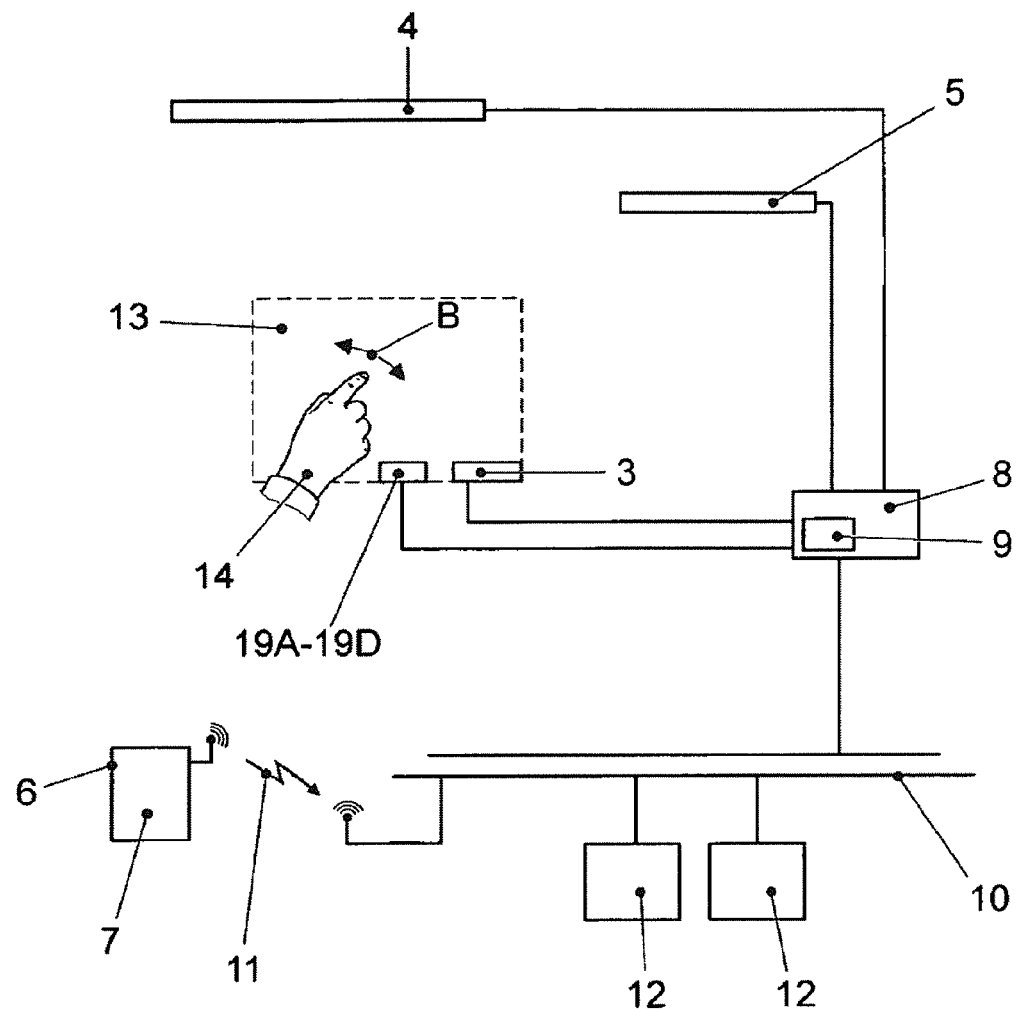
FIG. 2 schematically shows the structure of at least one disclosed embodiment of a vehicle operating system for providing a user interface.

FIG. 2 schematically illustrates the structure of the array for providing a user interface, as described with reference to FIG. 1. The displays 4, 5 which are permanently installed in the vehicle 1 and are spaced apart are arranged in the cockpit of the vehicle 1 in such a manner that they form a display area which is outside the grasping range of the vehicle occupants.

The camera 3 monitors a detection space 13 in which the movements of the vehicle occupants can be monitored. In particular, gestures can be detected in the detection space 13 from movements B of a hand 14 of one of the vehicle occupants. In this case, the detection space 13 is arranged in such a manner that the display area, in which an object 15A-15F provided for interaction is displayed, is arranged outside the detection space 13. In the present disclosed embodiment, the detection space 13 is at a distance from the displays 4 and 5.

The contact zones 19A-19D of the touch-sensitive surfaces on the steering wheel 2 are in the detection space 13, with the result that gestures can also be detected in at least two phases. A first phase of the gesture can be started on one of the contact zones 19A-19D and can be contactlessly continued seamlessly in space in a second phase of the gesture. In this case, the two phases of the gesture can be detected without interruption as one gesture.

The displays 4, 5 and the camera 3 and the contact zones 19A-19D of the touch-sensitive surfaces formed on the steering wheel 2 are connected to a control unit 8. In this case, the control unit 8 can receive the recorded signals from the detection space 13 and can associate them with particular gestures using an evaluation unit 9.

The control unit 8 is also connected, via the data bus 10 in the vehicle 1, to a radio interface 11 which can be used to connect the portable infotainment device 6 which is brought along using data technology. This may be any desired radio interface for interchanging data over short distances. It is, for example, a Bluetooth, WLAN (Wireless Local Area Network) or infrared interface. The control unit 8 can also use the data bus 10 to receive data relating to graphical objects 15A-15F which are stored in various functional devices 12 in the vehicle 1 using data technology. The functional devices 12 are, in particular, an infotainment system, a driver assistance system, a communication system and comfort devices of the vehicle 1, for example the air-conditioning system.

According to illustrative embodiments, the control unit 8 can control the display contents in the display area, which is formed by the displays 4, 5, 7, and can trigger functions of the functional devices 12 on the basis of the associated gestures, as is now explained in more detail in connection with the disclosed embodiment of the method according to the invention. The array according to the invention described with reference to FIGS. 1 and 2 can be used, in particular, for this purpose.

FIGS. 3A-3D schematically illustrate gestures for interacting with graphical objects 15A-15F which have been detected in a detection space 13 according to at least one disclosed embodiment of the method for providing a user interface. FIGS. 4A-4D schematically illustrate the interactions with the graphical objects 15A-15F on the displays 4, 5, 7 which have been operated according to the gestures shown in FIGS. 3A-3D.

As the starting situation, different graphical objects 15A-15F are displayed on the display area formed by the displays 4, 5, 7. The display area is outside the grasping range of the individual vehicle occupants if they are on the seats with their seat belts fastened. Furthermore, further parts of the display area cannot be conveniently reached by any of the vehicle occupants in such a manner that continuous operation by means of touchscreen operation, for example, would be possible. The detection space is at a distance from these display areas.

Figure 3A:
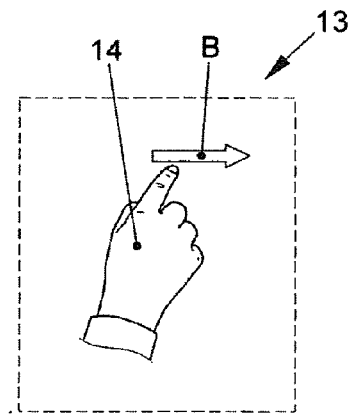
FIGS. 3A-3D schematically show gestures for interacting with graphical objects, as are detected in a detection space according to at least one disclosed embodiment of the method for providing a user interface.

In FIG. 3A, a movement B of the user's hand 14 is detected by the camera 3 in the detection space 13. The movement B is associated with a gesture in the evaluation unit 9, a specific interaction in turn being associated with the gesture. In the situation shown, the user carries out a swiping gesture from left to right with his index finger. Alternatively, he could also have used two fingers or the entire open hand, for example. A relative movement B from left to right is extracted from the gesture.

Figure 4A:
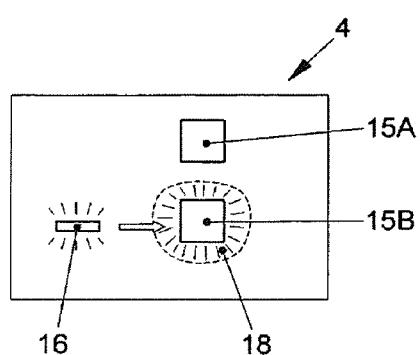
FIGS. 4A-4D schematically show interactions with graphical objects on a display surface which were operated according to the gestures shown in FIGS. 3A-3D.

Since none of the displayed graphical objects 15A, 15B has yet been selected at this time, the cursor 16 displayed on the display 4 is controlled until it has been moved, from left to right, to an area 18 surrounding the graphical object 15B (see FIG. 4A). The user can select the object 15B in this manner. He continues the movement B in any desired direction to move the graphical object 15B, which has now been selected, on the basis of the continued movement. The user moves the graphical object 15B within part of the display area outside his grasping range. He moves the graphical object 15B further to the right, for example, in which case the relative movement B with which the graphical object 15B is moved is in turn determined from the continued movement B.

Figure 3C:
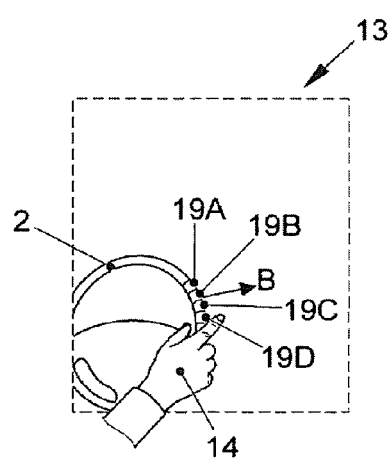
Figure 3B:
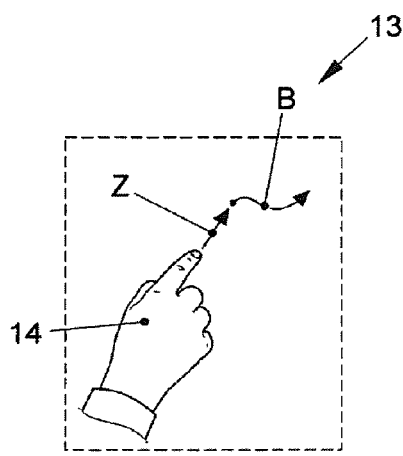

In FIG. 3B, a pointing gesture of the user's hand 14 is detected by the camera 3 in the detection space 13. The pointing direction Z is determined from the detected pointing gesture and the evaluation unit 9 is used to calculate an extension from the hand 14 in the direction of the display area until the extension intersects the display area. The control unit 8 then generates a control signal for the display 4, with the result that a pointing point 17 is displayed on the display 4 at the calculated point of intersection (see FIG. 4B). If the pointing point 17 is in the area 18 surrounding the graphical object 15B, the latter is visually highlighted and selected. As a result of the pointing point 17 being displayed, the user is able to correct the pointing direction, with the result that he can also effortlessly select graphical objects which are further away.

If the graphical object 15B has been selected, the user can now change the gesture to a swiping or pulling gesture, with the result that a direction of movement B can be extracted from the gesture, as described above, on the basis of which direction the graphical object 15B is moved. Alternatively, the user can also change the pointing gesture to another gesture, for example a flicking or snapping gesture, with which a function associated with the graphical object 15B is carried out.

In the two situations mentioned above, the graphical object 15B was first of all selected, in each case in a two-phase gesture, in the first phase of the gesture and interaction with the graphical object 15B was then carried out in the second phase of the gesture. Alternatively, the graphical object 15B may already have been previously selected by a different user action or by the system. The graphical object 15B is, for example, an incoming message from the communication system 12, for example an SMS (Short Message Service) which was automatically displayed after reception and was presented as a selected object 15B.

FIG. 3C illustrates a two-phase gesture which is started in a contact zone 19A-19D of the touch-sensitive surface on the steering wheel 2 and is continued freely in space. In the first phase, the contact zone 19B is determined in this case as the starting point of the gesture. The driver of the vehicle 1 uses his index finger, for example, to swipe radially to the outside over the corresponding place on the steering wheel rim.

Figure 4C:
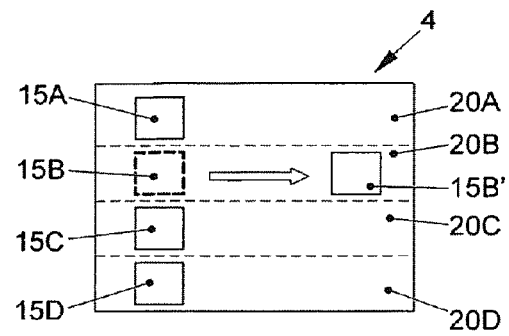
Figure 4B:
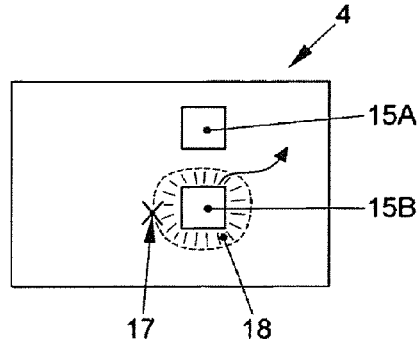

At this time, a graphical list with four entries is displayed on the display 4. The display 4 is subdivided into four operating lines 20A-20D and the graphical objects 15A-15D in the graphical list are associated with the respective operating lines 20A-20D, as illustrated in FIG. 4C. The operating line 20B and therefore the graphical object 15B are then selected for interaction on the basis of the determined contact zone 19B.

The second phase of the gesture illustrated in FIG. 3C comprises a swiping gesture which is again detected by the camera 3 and the direction of movement B of which is calculated by the evaluation unit 9. The previously selected graphical object 15B is then moved on the basis of the calculated direction of movement B and is displayed as a moved object 15B'. In this case, the swiping gesture can be carried out in such a manner that the driver leaves his hand 14 on the steering wheel 2 and only moves his index finger from left to right. Alternatively, the driver can also carry out the gesture in such a manner that he carries out the second phase as a free-hand gesture in space beside the steering wheel 2.

Figure 3D:
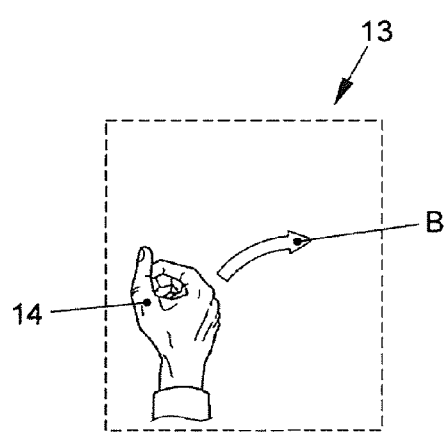
Figure 4D:
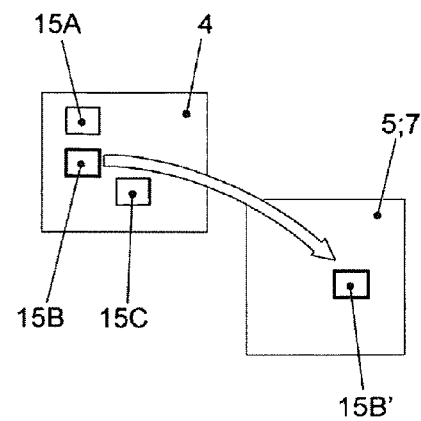

Further gesture operation of a graphical object 15B provided for interaction is illustrated with reference to FIGS. 3D and 4D. The graphical object 15B was previously selected in any desired manner. It was selected, for example, by the system on the basis of the operating context and was visually highlighted. The user carries out a grasping gesture which is detected by the camera 3 and is associated with the graphical object 15B which has already been selected.

When carrying out the grasping gesture, the user moves his hand 14 to the right in accordance with a discarding gesture, with the result that the evaluation unit 9 extracts a direction of movement B. An interaction whereby the accordingly selected graphical object 15B should be moved to another part of the display area is associated with the combined grasping and discarding gesture. In the situation shown, the graphical object 15B is moved or copied from the display 4. A copy of it is displayed as a display object 15B', for example, on the additional display 5 or on the display 7 of the infotainment device 6 which has been brought along.

In the situation shown, this is, for example, a media file, for example a music or video clip, which can be distributed by the driver of the vehicle 1 to another passenger on a media payback device associated with the passenger's seat. In this manner, the entertainment program can be controlled, for example, on the rear seats of the vehicle 1. When the graphical object 15B is moved to a display 7 of an infotainment device 6 which has been brought along, the control unit 8 generates a control signal upon the detection of the combined grasping and discarding or moving gesture, which control signal initiates the data transmission of the graphical object 15B stored using data technology via the radio link 11.

Graphical user interfaces are known, in particular, in computers and in operating systems of electronic devices in which they allow the user to interact with the machine using graphical symbols (also referred to as objects). In this case, these objects can be controlled in various ways. They can be selected or moved, for example, using an electronic mouse, using a touch-sensitive display surface or using gestures which are detected in front of or on the display surface and are converted into control signals. Furthermore, a selected object can also be used to carry out a function which is associated with the object and is intended to control a device.

On account of the increase in electronic devices in vehicles, there has been a transition in the meantime to also equip vehicles with an operating system having a graphical user interface to be able to control the various devices of the vehicle, for example the radio, CD player, communication device or navigation system, using a small number of operating elements.

In this case, operating concepts with a graphical user interface in vehicles can be implemented on large, freely programmable display surfaces, in the case of which objects can be displayed at any desired location and can be selected or moved by a vehicle occupant. In this case, however, a plurality of special features should be taken into account when using such operating concepts in a vehicle. On the one hand, it must be ensured that the driver is not distracted from driving the vehicle and observing the road traffic when using the graphical user interface. The operating actions for operating the objects must be able to be carried out quickly and intuitively. In addition, it is necessary to bear in mind the restricted mobility of the vehicle occupants who are largely tied to the respective sitting positions, in particular as a result of a requirement to use seat belts.

One problem in this case is that, in the case of large display surfaces which extend over the entire width of the vehicle, the situation may occur in which objects which can be freely placed are outside a user's reach on account of the restricted mobility of the vehicle occupants. For example, the passenger has moved an object to the right so that he can comfortably reach it with his right hand. Such an object now cannot be reached or can be reached only with difficulty by the driver under certain circumstances.

DE 10 2009 048 834 A1 describes a method and an apparatus for displaying information, in which graphical objects on a display surface can be operated without the user having to touch the display surface. For this purpose, the position and movement of the user's hand, for example, in a locale in front of the display surface are detected and are associated with different gestures.

DE 10 2009 032 069 A1 describes a method and an apparatus for providing a user interface in a vehicle, in which gestures are contactlessly detected in a detection space in front of the display surface. In this case, the direction of movement of the gesture can be evaluated and an operating object can be operated using a movement element, for example a virtual slide switch or rotary switch.

US 2011/0022307 A1 describes a method for operating a navigation program which is displayed on a touchscreen. As an object approaches the touch-sensitive surface, the sensitivity can be increased in this case to detect the object, with the result that the user no longer has to directly touch the touchscreen. Detection is effected capacitively, for example, using a plurality of measuring points on the touchscreen.

US 2011/0050589 A1 describes an operating method for a vehicle using gestures. In this case, hand gestures on any desired predetermined surface in the vehicle are detected and evaluated. For example, the driver of the vehicle can write alphanumeric characters on the steering wheel.

DE 10 2009 059 867 A1 describes a method and an apparatus for providing a graphical user interface, in which graphical objects are displayed on a display surface and a gesture on or in front of a display surface is detected. As a result, at least one subset of the displayed objects is moved into the vicinity of the position in which the gesture was carried out. In particular, objects which were positioned outside the user's reach can be moved to the location of the gesture in this manner.

LIST OF REFERENCE SYMBOLS

1 Vehicle
2 Steering wheel
3 Camera
4 Multifunction display in the cockpit
5 Additional display in the cockpit
6 Portable infotainment device
7 Display of the infotainment device
8 Control unit
9 Evaluation unit
10 Data bus in the vehicle
11 Radio interface
12 Functional devices in the vehicle
13 Detection space
14 User's hand
15A-15F Graphical objects
16 Cursor
17 Pointing point
18 Surrounding area
19A-19D Contact zones
20A-20D Operating lines
B Direction of movement
Z Pointing direction

The invention claimed is:

1. A method for providing a user interface coupled to a processor, in a vehicle, the method comprising:
displaying at least one graphical object for interaction in a display area of the user interface outside the user's reach;
detecting a user's gesture in a detection space which is spatially separate from the display area such that the detection space is within the user's reach;
selecting a graphical object of the at least one graphical object for interaction via the processor; and
carrying out an interaction associated with the gesture using the selected graphical object via the processor,
wherein one or more position(s) adopted by the selected graphical object in the display area during interaction are outside the user's reach,
wherein the position of the selected object provided for interaction in the display area is independent of the area in the detection space in which the gesture was detected, and gestures are detected in the detection space without user approach to the selected object,
wherein the method further comprises:
detecting a first phase of the gesture on a touch-sensitive surface within the detection space in the user's reach;
determining, in the first phase of the gesture, a contact zone based on the gesture on the touch-sensitive surface, and selecting the object based on the determined contact zone on the touch-sensitive surface; and
contactlessly detecting a second phase of the gesture within the detection space, wherein the trajectories of the first and second phases of the gesture are associated with one another to interact with the display area of the user interface outside the user's reach.

2. The method of claim 1, further comprising:
displaying a selection pointer in the display area;
extracting a relative movement (B) from the gesture;
changing the position of the selection pointer in the display area based on the extracted relative movement (B) of the gesture; and
selecting the graphical object based on the position of the selection pointer.

3. The method of claim 1, further comprising:
determining a direction (Z) in space from the detected gesture;
calculating a point in the display area based on the determined direction; and
visualizing the selection of the graphical object if the graphical object is in a predetermined area surrounding the calculated point.

4. The method of claim 1, wherein the touch-sensitive surface comprises a surface at a distance from the display area in the reach of the driver of the vehicle.

5. The method of claim 1, wherein the position of the selected graphical object in the display area is changed based on relative movement (B) of the gesture.

6. The method of claim 5, wherein the display area comprises at least one first display surface and one second display surface which are spatially separate from one another, and as a result of the gesture, the selected graphical object is moved from the first display surface to the second display surface.

7. The method of claim 6, wherein the first and/or second display surface is/are arranged on a device which is releasably connected to the vehicle, in particular a portable device.

8. A vehicle operating system for providing a user interface coupled to a processor, the vehicle operating system comprising:
an interface for receiving graphical objects which are stored using data technology and are provided for interaction;
a display surface for displaying graphical objects provided for interaction in a display area that is outside a user's reach;
a gesture detection device for detecting the user's gestures in a detection space, the detection space being determined by a reach of the user restricted within a firmly predefined user area and being spatially separate from the display area such that the detection space is within the user's reach;
the processor including a control unit connected to the interface, the display surface and the gesture detection device, wherein the control unit receives signals for selecting graphical objects and controls interactions with selected graphical objects which are associated with the gestures,
wherein, the control unit controls display of a selected graphical object for interaction in a display area outside the user's reach, wherein the interaction is carried out such that at least one position adopted by the selected graphical object during interaction is/are outside the user's reach, and wherein the position of the selected object provided for interaction in the display area is independent of the area in the detection space in which the gesture was detected, and gestures are detected in the detection space without user approach to the selected object, wherein the gesture detection device detects a first phase of the gesture on a touch-sensitive surface within the detection space in the user's reach, and contactlessly detects a second phase of the gesture within the detection space, wherein the trajectories of the first and second phases of the gesture are associated with one another to interact with the display area that is outside the user's reach, and wherein, in the first phase of the gesture, a contact zone is determined based on the gesture on the touch-sensitive surface, and the object is selected based on the determined contact zone on the touch-sensitive surface.

9. The vehicle operating system of claim 8, wherein a selection pointer is displayed in the display area, a relative movement (B) is extracted from the gesture by the gesture detection device, a position of the selection pointer in the display area is based on the extracted relative movement (B) of the gesture; and the graphical object is selected based on the position of the selection pointer.

10. The vehicle operating system of claim 8, wherein a direction (Z) in space is determined from the detected gesture, a point in the display area is calculated based on the determined direction, and the selection of the graphical object is visualized if the graphical object is in a predetermined area surrounding the calculated point.

11. The vehicle operating system of claim 8, wherein the touch-sensitive surface comprises a surface at a distance from the display area in the reach of the driver of the vehicle.

12. The vehicle operating system of claim 8, wherein the position of the selected graphical object in the display area is changed based on relative movement (B) of the gesture.

13. The vehicle operating system of claim 12, wherein the display area comprises at least one first display surface and one second display surface which are spatially separate from one another, and as a result of the gesture, the selected graphical object is moved from the first display surface to the second display surface.

14. The vehicle operating system of claim 13, wherein the first and/or second display surface is/are arranged on a device which is releasably connected to the vehicle, in particular a portable device.

* * * * *